United States Patent [19]  [11]  4,369,196
Sukegawa  [45]  Jan. 18, 1983

[54] FRESH CHEESE-LIKE FOOD PRODUCTS AND A PROCESS FOR THEIR PREPARATION

[76] Inventor: Yukie Sukegawa, Soen Broad Heights, 15-1-2, Kitagojo-nishi, Chuo-ku, Sapporo-shi, Hokkaido, Japan, 064

[21] Appl. No.: 260,397

[22] Filed: May 4, 1981

[30] Foreign Application Priority Data

May 5, 1980 [JP] Japan .................................. 55-59806

[51] Int. Cl.³ .......................... A23C 23/00; A23J 3/00
[52] U.S. Cl. .................................... 426/104; 426/580; 426/656
[58] Field of Search .............. 426/580, 582, 520, 104, 426/656

[56] References Cited
U.S. PATENT DOCUMENTS 2,011,074  8/1935  Pasternack et al. ................ 426/582
3,741,774  6/1973  Burkwall ............................ 426/582
3,806,606  4/1974  Seiden ................................ 426/582
3,840,672  10/1974 Kasik et al. ........................ 426/582
3,870,811  3/1975  Schulz ................................ 426/580

Primary Examiner—Raymond N. Jones
Assistant Examiner—Elizabeth J. Curtin
Attorney, Agent, or Firm—Cushman, Darby & Cushman

[57] ABSTRACT

Fresh cheese-like food products may be obtained by adding at least one thermally coagulable protein selected from the group consisting of whey protein, liquid albumen, liquid whole egg, albumen powder and whole egg powder and a coagulant composed of starch and glucono-δ-lactone to milk and/or skimmed milk, mixing them, and heating the mixture to effect coagulation.

These food products have a water content of 75–85% by weight, a fat content of 0–8% by weight and a protein content of 5–10% by weight, are rich in calcium and vitamin $B_2$, and exhibit a milk flavor and slightly sweet taste attributable to lactose.

9 Claims, No Drawings

FRESH CHEESE-LIKE FOOD PRODUCTS AND A PROCESS FOR THEIR PREPARATION

BACKGROUND OF THE INVENTION

1. Field of the Invention

This invention relates to fresh cheese-like food products and a process for their production, and more particularly it relates to novel fresh cheese-like food products which can be obtained by adding a thermally coagulable protein and a specific coagulant to milk and heating to effect coagulation, and a process for their production.

2. Description of the Prior Art

Heretofore, there have been known curd, milk curd and yoghurt as products obtained by coagulating milk.

The curd is a coagulum which is formed by adding a starter or an acid to whole milk or skimmed milk or reacting the latter with rennet. While the main component of the curd obtained by coagulating skimmed milk is protein containing almost no fat, the curd obtained from whole milk has a water content of 35-70% by weight, a fat content of 5-33% by weight and a protein content of 15-30% by weight. Curd is employed as the starting material for producing cheese.

The milk curd is that obtained by adding an acid to whole milk, heating to effect coagulation, filtering off the formed curd and pressing it, and has a composition of a water content of 50-60% by weight, a fat content of 15-20% by weight and a protein content of 15-20% by weight. This is not on the market as a commercial product, but is merely produced in some quarters for home consumption.

The yoghurt is a thick coagulated milk obtained by fermenting whole milk or skimmed milk, either as such or after partial concentration, using a specific lactic acid bacterium, and has a water content of 78-85% by weight, a fat content of 0.2-2.1% by weight and a protein content of 3.6-4.3% by weight.

However, all of these coagulated products are those obtained by coagulating milk under the acidic conditions of pH 6-4, and thus they inevitably exhibit acid taste.

On the other hand, although it is possible to obtain a coagulated product which does not exhibit acid taste by gelling milk by adding agar, gelatin or other gum matters, said coagulated product is not suitable for cooking purposes, because it dissolves by heating to a temperature even below the boiling point of water.

Casein which is the main component of milk is not easily coagulated by heating and does not form a uniform gel even by adding a coagulant other than acid and heating but exhibits such phenomenon as syneresis, and therefore it has been difficult to obtain a coagulated product from milk, which does not undergo decomposition of the gel structure even by heating to a temperature below the boiling point of water and also does not exhibit acid taste.

STATEMENT OF THE OBJECT OF THE INVENTION

Accordingly, one object of this invention is to provide novel fresh cheese-like food products which are coagulated products of whole milk or skimmed milk and which exhibit substantially no acid taste.

Another object of this invention is to provide a process for preparing novel fresh cheese-like food products which can be used for cooking and exhibit no acid taste while utilizing the whole components of whole milk or skimmed milk.

Other objects and advantages of this invention will become apparent from the embodiments and description given hereinbelow.

SUMMARY OF THE INVENTION

According to this invention, fresh cheese-like food products may be obtained by adding (A) at least one thermally coagulable protein selected from the group consisting of whey protein, liquid albumen, liquid whole egg, albumen powder and whole egg powder and (B) a coagulant composed of starch and glucono-δ-lactone to (C) milk selected from the group consisting of whole milk, skimmed milk and a mixture of whole milk and skimmed milk, mixing them, and heating the mixture to effect coagulation.

The afore-mentioned fresh cheese-like food products have a water content of 75-85% by weight, a fat content of 0-8% by weight and a protein content of 5-10% by weight, are rich in calcium and vitamin $B_2$, exhibit a milk flavor and slightly sweet taste attributable to lactose, and exhibit no acid taste. Furthermore, said food products do not undergo decomposition of the gel structure even by heating to a temperature below the boiling point of water and thus can be cooked.

DESCRIPTION OF THE PREFERRED EMBODIMENT

The starting material for producing the fresh cheese-like food products according to this invention is milk selected from the group consisting of whole milk, skimmed milk and a mixture of whole milk and skimmed milk. Said milk is preferably that which has been pasteurized in view of both the shelf life of itself and that of its products.

To the afore-mentioned starting material is added at least one thermally coagulable protein selected from the group consisting of whey protein, liquid albumen, liquid whole egg, albumen powder and whole egg powder. If the proportion of said thermally coagulable protein added is too low, coagulation of milk is insufficient, while if the proportion is too high, the resulting fresh cheese-like food product lacks a smooth feel and gives a powdery feel. Favorable results are, therefore, obtained when the thermally coagulable protein is added in an amount as solids of 31-83 parts by weight per 100 parts by weight of the milk solids. Particularly where whey protein is employed, it is preferred to add said whey protein in an amount of 31-62 parts by weight per 100 parts by weight of the milk solids, while in the case of employing at least one thermally coagulable protein selected from the group consisting of liquid albumen, liquid whole egg, albumen powder and whole egg powder, it is preferred to add said protein in an amount as solids of 40-83 parts by weight per 100 parts by weight of the milk solids.

To the starting material for preparing the fresh cheese-like food products according to this invention is added a coagulant composed of starch and glucono-δ-lactone. Said coagulant preferably has a composition of 55-71% by weight of starch and corresponding 29-45% by weight of glucono-δ-lactone. While any starch may be employed, corn starch is especially preferred, because when it is employed, the gel structure of the product has excellent stability. Said coagulant is preferably added in an amount of 4-8 parts by weight per 100 parts by weight of the starting material solids except the coagulant itself (that is, the total amount of the solids of the milk, thermally coagulable protein and optionally incorporated components).

In addition to the afore-mentioned milk, thermally coagulable protein and coagulant, it is also possible, if necessary, to further add skimmed milk powder to the afore-mentioned starting material for preparing the fresh cheese-like food products. Addition of skimmed milk powder increases the protein content of the product and makes the gel structure harder. It is preferred to add up to 40 parts by weight of skimmed milk powder per 100 parts by weight of said milk solids, 20–40 parts by weight being especially preferred.

If necessary, a small amount of calcium sulfate may be added to the starting material for preparing the fresh cheese-like food products. Addition of calcium sulfate promotes the thermal coagulation of casein and a product having a harder gel structure may be formed. The proportion of calcium sulfate added is preferably 7 parts by weight or less, calculated as anhydrous $CaSO_4$, per 100 parts by weight of said coagulant.

Further, the starting material for preparing the fresh cheese-like food products may incorporate additives such as seasoning (e.g. sugar), flavors, coloring agents etc. as long as the water content, the fat content and the protein content of the resulting fresh cheese-like food product fall into the afore-mentioned numerical ranges, respectively. As an example of incorporating for flavoring, it is contemplated to add about 10 parts by weight of sugar and about one part by weight of a flavor (e.g. an essence having a flavor of lemon, banana, apple, coffee or yoghurt) per 100 parts by weight of the total amount of the solids of the milk, thermally coagulable protein, coagulant and, if any, skimmed milk powder.

The afore-mentioned milk, thermally coagulable protein, coagulant and other components to be added as needed may be mixed in any order. Although it is possible to make a solution or dispersion by adding water to the thermally coagulable protein, coagulant and/or other components to be added as needed prior to mixing with milk, it is preferred to directly add the thermally coagulable protein, coagulant and other components to be added as needed to milk since the water content of the starting material milk is higher than the water content of the resulting fresh cheese-like food product.

For mixing the starting materials, it is preferred to stir and mix until a mixture in which the incorporated components appear substantially homogeneous to the naked eye is obtained, and especially it is preferred to employ a means for homogenizing. While this stirring and mixing operation may be performed at any temperature except too high temperatures which would cause denaturation of milk or too low temperatures which would freeze milk, it is preferably performed at 20°–50° C.

In the afore-mentioned stirring and mixing process, the starting material mixture generates foam, which can be advantageously eliminated by allowing the mixture after stirring to stand for about one to two hours. However, if it is desired to promote defoaming, a very small amount (for example, up to 50 ppm based on the weight of said starting material mixture) of a silicone defoaming agent may be added to said starting material mixture.

The starting material mixture after stirring is defoamed, filled into a container for gel formation and is coagulated by heating. If heating is insufficient, coagulation and pasteurization of said starting material mixture is insufficient, while too much heating promotes the browning reaction further accompanied by a cooked flavor; it is therefore preferred to heat said starting material mixture at 80°–90° C. for 30–40 minutes.

As has been described above, according to this invention, since milk is added with a thermally coagulable protein and a specific coagulant and heated to effect coagulation, a novel fresh cheese-like food product effectively utilizing the whole components of milk may be obtained. Said fresh cheese-like food product is rich in calcium and vitamin $B_2$, and exhibits a milk flavor and slightly sweet taste attributable to lactose. Furthermore, said fresh cheese-like food product exhibits no acid taste and can be used for cooking. Said food product has a water content of 75–85% by weight, a fat content of 0–8% by weight, a protein content of 5–10% by weight, a calcium content of 600–2000 ppm by weight (i.e. 60–200 mg per 100 g of the food product) and a vitamin $B_2$ content of 2.5–5.1 ppm by weight (i.e. 0.25–0.51 mg per 100 g of the food product). Especially it is preferred for excellent taste that said food product has a water content of 77.5–82.5% by weight, a fat content of 2.8–7.5% by weight and a protein content of 5.0–9.0% by weight.

The following example is given to illustrate a specific embodiment of this invention.

EXAMPLE 1

The following components were employed as the starting materials for preparing fresh cheese-like food product.

Whole milk—100 kg
Whey protein—10 kg
Corn starch—1 kg
Glucono-δ-lactone—0.7 kg
Calcium sulfate ($CaSO_4$)—0.1 kg At first, the whole milk was pasteurized at 120° C. for 2 seconds, and cooled to 30° C., after which the whey protein, corn starch, glucono-δ-lactone and calcium sulfate were added thereto and stirred to mix, followed by homogenizing.

The resulting mixture was allowed to stand for 2 hours to effect defoaming, filled into a container for gel formation carefully so as not to cause foaming, and sealed. Then, it was heated to 90° C. for 30 minutes, and cooled to normal temperature.

The composition per 100 g of the resulting fresh cheese-like food product was as follows:

Water content—79.0 g
Protein—8.4 g
Fat—3.0 g
Carbohydrate—9.0 g
Ash—0.9 g
Calcium—116 mg
Vitamin $B_2$—0.26 mg.

EXAMPLE 2

The following components were employed as the starting materials for preparing a fresh cheese-like food product.

Skimmed milk—100 kg
Whey protein—10 kg
Corn starch—1 kg
Glucono-δ-lactone—0.5 kg At first, the skimmed milk was pasteurized at 120° C. for 2 seconds, and cooled to 40° C., after which the whey protein, corn starch and glucono-δ-lactone were added thereto and stirred to mix, followed by homogenizing.

The resulting mixture was allowed to stand for 1 hour to effect defoaming, filled into a container for gel formation carefully so as not to cause foaming, and sealed. Then, it was heated to 90° C. for 30 minutes, and cooled to normal temperature.

The composition per 100 g of the resulting fresh cheese-like food product was as follows:
  Water content—81.7 g
  Protein—8.5 g
  Fat—0.03 g
  Carbohydrate—9.0 g
  Ash—0.8 g
  Calcium—86 mg
  Vitamin $B_2$—0.26 mg.

EXAMPLE 3

The following components were employed as the starting materials for preparing a fresh cheese-like food product.
  Whole milk—100 kg
  Whey protein—5 kg
  Skimmed milk powder—5 kg
  Corn starch—1 kg
  Glucono-δ-lactone—0.7 kg At first, the whole milk was pasteurized at 120° C. for 2 seconds, and cooled to 30° C., after which the whey protein, skimmed milk powder, corn starch and glucono-δ-lactone were added thereto and stirred to mix, followed by homogenizing.

The resulting mixture was allowed to stand for 2 hours to effect defoaming, filled into a container for gel formation carefully so as not to cause foaming, and sealed. Then, it was heated to 90° C. for 30 minutes, and cooled to normal temperature.

The composition per 100 g of the resulting fresh cheese-like food product was as follows:
  Water content—79.6 l g
  Protein—8.6 g
  Fat—3.0 g
  Carbohydrate—8.1 g
  Ash—0.7 g
  Calcium—160 mg
  Vitamin $B_2$—0.26 mg.

EXAMPLE 4

The following components were employed as the starting materials for preparing a fresh cheese-like food product.
  Whole milk—100 kg
  Skimmed milk powder—5 kg
  Albumen powder—5 kg
  Corn starch—0.8 kg
  Glucono-δ-lactone—0.5 kg At first, the whole milk was pasteurized at 120° C. for 2 seconds, and cooled to 45° C., after which the skimmed milk powder, albumen powder, corn starch and glucono-δ-lactone were added thereto and stirred to mix, followed by homogenizing.

The resulting mixture was allowed to stand for 2 hours to effect defoaming, filled into a container for gel formation carefully so as not to cause foaming, and sealed. Then, it was heated to 80° C. for 40 minutes, and cooled to normal temperature.

The composition per 100 g of the resulting fresh cheese-like food product was as follows:
  Water content—80.8 g
  Protein—7.6 g
  Fat—3.0 g
  Carbohydrate—7.5 g
  Ash—1.1 g
  Calcium—160 mg
  Vitamin $B_2$—0.40 mg.

EXAMPLE 5

The following components were employed as the starting materials for preparing a fresh cheese-like food product.
  Whole milk—100 kg
  Skimmed milk powder—5 kg
  Whole egg powder—5 kg
  Corn starch—1 kg
  Glucono-δ-lactone—0.7 kg
  Calcium Sulfate ($CaSO_4$)—0.1 kg At first, the whole milk was pasteurized at 120° C. for 2 seconds, and cooled to 40° C., after which the skimmed milk powder, whole egg powder, corn starch, glucono-δ-lactone and calcium sulfate were added thereto and stirred to mix, followed by homogenizing.

The resulting mixture was allowed to stand for 1 hour to effect defoaming, filled into a container for gel formation carefully so as not to cause foaming, and sealed. Then, it was heated to 80° C. for 40 minutes, and cooled to normal temperature.

The composition per 100 g of the resulting fresh cheese-like food product was as follows:
  Water content—80.2 g
  Protein—6.0 g
  Fat—5.1 g
  Carbohydrate—7.6 g
  Ash—1.1 g
  Calcium—195 mg
  Vitamin $B_2$—0.31 mg.

EXAMPLE 6

The following components were employed as the starting materials for preparing a fresh cheese-like food product.
  Whole milk—100 kg
  Albumen powder—10 kg
  Corn starch—0.8 kg
  Glucono-δ-lactone—0.4 kg At first, the whole milk was pasteurized at 120° C. for 2 seconds, and cooled to 40° C., after which the albumen powder, corn starch and glucono-δ-lactone were added thereto and stirred to mix, followed by homogenizing.

The resulting mixture was allowed to stand for 1 hour to effect defoaming, filled into a container for gel formation carefully so as not to cause foaming, and sealed. Then, it was heated to 80° C. for 40 minutes, and cooled to normal temperature.

The composition per 100 g of the resulting fresh cheese-like food product was as follows:
  Water content—79.2 g
  Protein—8.5 g
  Fat—3.0 g
  Carbohydrate—8.3 g
  Ash—0.8 g
  Calcium—66 mg
  Vitamin $B_2$—0.51 mg.

EXAMPLE 7

The following components were employed as the starting materials for preparing a fresh cheese-like food product.
 Skimmed milk—100 kg
 Albumen powder—10 kg
 Corn starch—0.7 kg
 Glucono-δ-lactone—0.5 kg At first, the skimmed milk was pasteurized at 120° C. for 2 seconds, and cooled to 40° C., after which the albumen powder, corn starch and glucono-δ-lactone were added thereto and stirred to mix, followed by homogenizing.

The resulting mixture was allowed to stand for 2 hours to effect defoaming, filled into a container for gel formation carefully so as not to cause foaming, and sealed. Then, it was heated to 80° C. for 40 minutes, and cooled to normal temperature.

The composition per 100 g of the resulting fresh cheese-like food product was as follows:
 Water content—82.0 g
 Protein—8.6 g
 Fat—0.02 g
 Carbohydrate—8.3 g
 Ash—0.8 g
 Calcium—70 mg
 Vitamin $B_2$—0.51 mg.

EXAMPLE 8

The following components were employed as the starting materials for preparing a fresh cheese-like food product.
 Whole milk—100 kg
 Whole egg powder—10 kg
 Corn starch—1 kg
 Glucono-δ-lactone—0.7 kg
 Calcium sulfate ($CaSO_4$)—0.1 kg At first, the whole milk was pasteurized at 120° C. for 2 seconds, and cooled to 40° C., after which the whole egg powder, corn starch, glucono-δ-lactone and calcium sulfate were added thereto and stirred to mix, followed by homogenizing.

The resulting mixture was allowed to stand for 2 hours to effect defoaming, filled into a container for gel formation carefully so as not to cause foaming, and sealed. Then, it was heated to 90° C. for 30 minutes, and cooled to normal temperature.

The composition per 100 g of the resulting fresh cheese-like food product was as follows:
 Water content—78.8 g
 Protein—5.0 g
 Fat—7.2 g
 Carbohydrate—8.5 g
 Ash—0.8 g
 Calcium—102 mg
 Vitamin $B_2$—0.32 mg.

EXAMPLE 19

The following components were employed as the starting materials for preparing a fresh cheese-like food product.
 Whole milk—100 kg
 Whey protein—5 kg
 Albumen powder—5 kg
 Corn starch—0.7 kg
 Glucono-δ-lactone—0.4 kg At first, the whole milk was pasteurized at 120° C. for 2 seconds, and cooled to 45° C., after which the whey protein, albumen powder, corn starch and glucono-δ-lactone were added thereto and stirred to mix, followed by homogenizing.

The resulting mixture was allowed to stand for 2 hours to effect defoaming, filled into a container for gel formation carefully so as not to cause foaming, and sealed. Then, it was heated to 90° C. for 30 minutes, and cooled to normal temperature.

The composition per 100 g of the resulting fresh cheese-like food product was as follows:
 Water content—79.6 g
 Protein—8.4 g
 Fat—3.0 g
 Carbohydrate—8.3 g
 Ash—0.7 g
 Calcium—73 mg
 Vitamin $B_2$—0.38 mg.

EXAMPLE 10

The following components were employed as the starting materials for preparing a fresh cheese-like food product.
 Whole milk—100 kg
 Whey potein—5 kg
 Whole egg powder—5 kg
 Corn starch—1 kg
 Glucono-δ-lactone—0.7 kg
 Calcium sulfate ($CaSO_4$)—0.1 kg At first, the whole milk was pasteurized at 120° C. for 2 seconds, and cooled to 40° C., after which the whey protein, whole egg powder, corn starch, glucono-δ-lactone and calcium sulfate were added thereto and stirred to mix, followed by homogenizing.

The resulting mixture was allowed to stand for 2 hours to effect defoaming, filled into a container for gel formation carefully so as not to cause foaming, and sealed. Then, it was heated to 90° C. for 30 minutes, and cooled to normal temperature.

The composition per 100 g of the resulting fresh cheese-like food product was as follows:
 Water content—78.9 g
 Protein—6.8 g
 Fat—5.1 g
 Carbohydrate—8.7 g
 Ash—0.7 g
 Calcium—110 mg
 Vitamin $B_2$—0.29 mg.

EXAMPLE 11

The following components were employed as the starting materials for preparing a fresh cheese-like food product.
 Whole milk—100 kg
 Skimmed milk powder—5 kg
 Liquid albumen—40 kg
 Corn starch—0.5 kg
 Glucono-δ-lactone—0.2 kg At first, the whole milk was pasteurized at 120° C. for 2 seconds, and cooled to 25° C., after which the skimmed milk powder, liquid albumen, corn starch and glucono-δ-lactone were added thereto and stirred to mix, followed by homogenizing.

The resulting mixture was allowed to stand for 2 hours to effect defoaming, filled into a container for gel formation carefully so as not to cause foaming, and sealed. Then, it was heated to 80° C. for 40 minutes, and cooled to normal temperature.

The composition per 100 g of the resulting fresh cheese-like food product was as follows:

Water content—85.0 g
Protein—6.2 g
Fat—2.4 g
Carbohydrate—5.4 g
Ash—0.95 g
Calcium—125 mg
Vitamin $B_2$—0.29 mg.

EXAMPLE 12

The following components were employed as the starting materials for preparing a fresh cheese-like food product.

Whole milk—100 kg
Skimmed milk powder—5 kg
Liquid whole egg—40 kg
Corn starch—0.5 kg
Glucono-δ-lactone—0.4 kg At first, the whole milk was pasteurized at 120° C. for 2 seconds, and cooled to 30° C., after which the skimmed milk powder, liquid whole egg, corn starch and glucono-δ-lactone were added thereto and stirred to mix, followed by homogenizing.

The resulting mixture was allowed to stand for 2 hours to effect defoaming, filled into a container for gel formation carefully so as not to cause foaming, and sealed. Then, it was heated to 80° C. for 40 minutes, and cooled to normal temperature.

The composition per 100 g of the resulting fresh cheese-like food product was as follows:

Water content—81.1 g
Protein—6.8 g
Fat—5.5 g
Carbohydrate—5.6 g
Ash—1.0 g
Calcium—138 mg
Vitamin $B_2$—0.29 mg.

What is claimed is:

1. A process for preparing a fresh cheese-like food product comprising
   (1) adding together components comprising (a) at least one thermally coagulable protein selected from the group consisting of whey protein, liquid albumen, liquid whole egg, albumen powder and whole egg powder, (b) a coagulant composed of 55 to 71 weight percent starch and 29 to 45 weight percent glucono-δ-lactone based on the total weight of said coagulant and (c) a milk selected from the group consisting of whole milk, skimmed milk and a mixture thereof, said thermally coagulable protein being added in an amount, as solids, sufficient for the coagulation of said components upon heating,
   (2) mixing said components to form a mixture thereof and
   (3) heating the resulting mixture of said components at a temperature and for a time sufficient to coagulate said resulting mixture.

2. The process of claim 1 wherein said coagulable protein is added in an amount of 31–83 parts by weight per 100 parts by weight of milk solids and said coagulant is added in an amount of 4–8 parts by weight per 100 parts by weight of said components, as solids, other than said coagulant.

3. The process of claim 1 wherein said protein is whey protein, added in an amount of 31–62 parts by weight per 100 parts by weight of milk solids.

4. The process of claim 1 wherein said protein is liquid albumen, liquid whole egg, albumen powder or whole egg powder, added in an amount of 40–83 parts by weight per 100 parts of milk solids.

5. The process of claim 1 wherein said starch is cornstarch.

6. The process of claim 1 which also includes incorporating skimmed milk powder in an amount up to 40 parts by weight of skimmed milk powder per 100 parts by weight of milk solids into said mixture of components, prior to heating said mixture of components.

7. The process of claim 6 wherein said skimmed milk powder is added in an amount of 20 to 40 parts by weight per 100 parts by weight of milk solids.

8. The process of claim 1 wherein said mixture of components is heated to a temperature ranging from 80° to 90° C. for a period of time ranging from 30 to 40 minutes.

9. A fresh cheese-like food product, having a water content of 75–85 weight percent, a fat content of 0–8 weight percent and a protein content of 5–10 weight percent, made in accordance with the process of claim 1.

* * * * *